United States Patent
Mu et al.

(10) Patent No.: US 6,540,252 B2
(45) Date of Patent: Apr. 1, 2003

(54) DUAL SEAM AIR BAG MODULE COVER

(75) Inventors: Wei Mu, Rochester Hills, MI (US); Jianping Sheng, Rochester Hills, MI (US); Chaozhuo Chen, Troy, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/875,838

(22) Filed: Jun. 6, 2001

(65) Prior Publication Data

US 2002/0185848 A1 Dec. 12, 2002

(51) Int. Cl.⁷ .............................................. B60R 21/16
(52) U.S. Cl. .................................................... 280/728.3
(58) Field of Search ........................ 280/728.1, 728.3, 280/743.1

(56) References Cited

U.S. PATENT DOCUMENTS

| | | | |
|---|---|---|---|
| 4,903,986 A | | 2/1990 | Cok et al. |
| 4,995,638 A | * | 2/1991 | Shinto et al. ............. 280/728.3 |
| 5,531,476 A | | 7/1996 | Kerner |
| 6,168,189 B1 | * | 1/2001 | Dennis ..................... 280/728.3 |
| 6,247,722 B1 | * | 6/2001 | Brodi, Jr. et al. ........ 280/728.3 |

FOREIGN PATENT DOCUMENTS

JP 4110251 4/1992

* cited by examiner

*Primary Examiner*—Eric Culbreth
(74) *Attorney, Agent, or Firm*—Tarolli, Sundheim, Covell, & Tummino L.L.P.

(57) ABSTRACT

An apparatus (10) for helping to protect a vehicle occupant (15) includes an inflatable vehicle occupant protection device (20), an inflator (30), and a cover (40) for the protection device (20). The inflator (30) provides inflation fluid to inflate the protection device (20). The cover (40) has side walls (42a, 42b, 42c, 42d) and a front wall (44) for positioning between the vehicle occupant (15) and the protection device (20). The cover (40) has at least one strong tear seam (50) and at least one weak tear seam (60). The weak tear seam (60) tears when subjected to a first force by the protection device (20). The strong tear seam (50) tears when subjected to a second force by the protection device (20). The second force is larger than the first force. The strong and weak tear seams (50, 60) are located so that a first portion (22) of the protection device (20) initially ruptures the weak tear seams (60). The protection device (20) initially deploys primarily laterally relative to the vehicle occupant (15). A second portion (24) of the protection device (20) subsequently ruptures the strong tear seam (50), and the protection device deploys primarily in a direction toward the vehicle occupant (15).

14 Claims, 2 Drawing Sheets

DUAL SEAM AIR BAG MODULE COVER

TECHNICAL FIELD

The present invention relates to an apparatus for helping to protect a vehicle occupant during a vehicle collision.

BACKGROUND OF THE INVENTION

A conventional apparatus for helping to protect a vehicle occupant includes an inflatable vehicle occupant protection device. The apparatus also includes an inflator for providing inflation fluid to inflate the vehicle occupant protection device, and a cover with seams that tear upon inflation of the inflatable vehicle occupant protection device. Some control over the deployment of the inflatable vehicle occupant protection device is desirable in order to limit the force applied by the inflatable vehicle occupant protection device to the vehicle occupant.

SUMMARY OF THE INVENTION

In accordance with the present invention, an apparatus for helping to protect a vehicle occupant includes an inflatable vehicle occupant protection device, an inflator, and a cover for the vehicle occupant protection device. The inflator provides inflation fluid to inflate the vehicle occupant protection device. The cover has side walls and a front wall for positioning between the vehicle occupant and the inflatable vehicle occupant protection device. The cover has at least one strong tear seam and at least one weak tear seam. The weak tear seam tears when subjected to a first force by the inflatable vehicle occupant protection device. The strong tear seam tears when subjected to a second force by the inflatable vehicle occupant protection device. The second force is larger than the first force.

The strong and weak tear seams are located so that a first portion of the inflatable vehicle occupant protection device initially ruptures the weak tear seam and the inflatable vehicle occupant protection device deploys primarily laterally relative to the vehicle occupant. A second portion of the inflatable vehicle occupant protection device subsequently ruptures the strong tear seam, and the inflatable vehicle occupant protection device deploys primarily in a direction toward the vehicle occupant.

BRIEF DESCRIPTION OF THE DRAWINGS

The foregoing and other features of the present invention will become apparent to those skilled in the art to which the present invention relates upon reading the following description of the invention with reference to the accompanying drawings, in which.

DESCRIPTION OF PREFERRED EMBODIMENT

Figure 1:
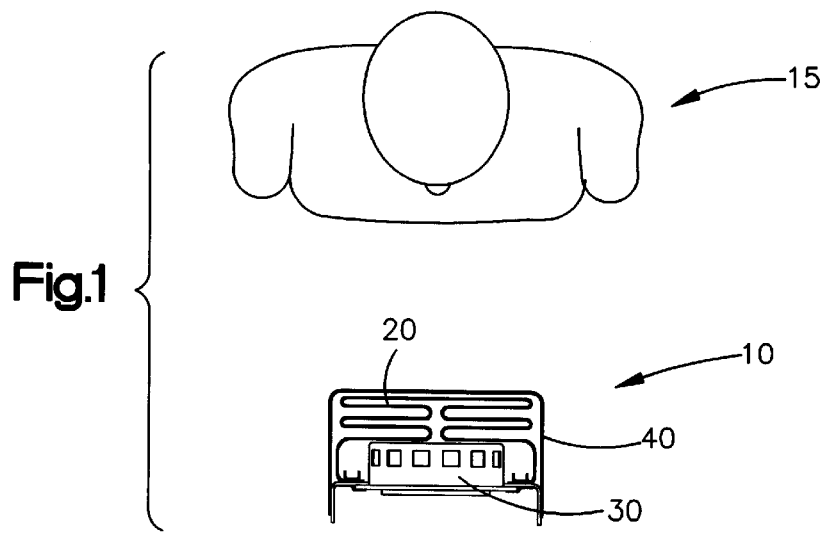
FIG. 1 is a schematic view of an apparatus embodying the present invention.

As representative of the present invention, FIG. 1 illustrates an apparatus 10 for helping to protect a vehicle occupant 15. The apparatus 10 includes an inflatable vehicle occupant protection device 20 (i.e., an air bag), an inflator 30, and a cover 40 for the vehicle occupant protection device 20. The inflator 30 provides inflation fluid to inflate the vehicle occupant protection device 20. The cover 40, the vehicle occupant protection device 20, and the inflator 30 are secured to a support structure that is fixedly secured to a vehicle.

A sensor (not shown) senses vehicle deceleration indicating a vehicle collision for which inflation of the inflatable vehicle occupant protection device 20 is desired. The sensor causes a signal to be transmitted to the inflator 30 to actuate the inflator. The inflator 30, when actuated, directs inflation fluid into the inflatable vehicle occupant protection device 20 to inflate the vehicle occupant protection device.

Figure 4:
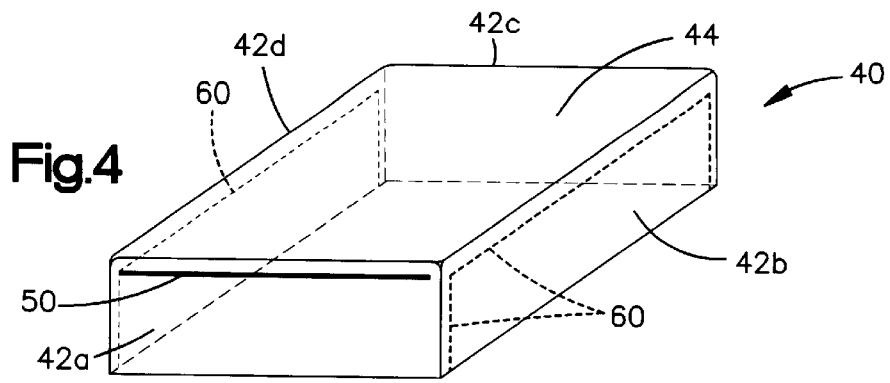
FIG. 4 is a schematic view of part of the apparatus of FIG. 1.

As seen in FIG. 4, the cover 40 has four side walls 42a, 42b, 42c, 42d and a front wall 44 interconnecting the side walls 42a, 42b, 42c, and 42d. The side walls 42a, 42b, 42c and 42d are secured to the support structure. The front wall 44 is positioned between the vehicle occupant 15 and the inflatable vehicle occupant protection device 20.

The cover 40 has at least one strong tear seam 50 and at least one weak tear seam 60. The weak tear seam 60 tears when subjected to a first force by the inflatable vehicle occupant protection device 20. The strong tear seam 50 tears when subjected to a second force by the inflatable vehicle occupant protection device 20. The second force is larger than the first force.

The strong and weak tear seams 50, 60 are located on the cover 40 so that a first portion 22 (FIG. 2) of the inflatable vehicle occupant protection device 20 initially ruptures the weak tear seam 60. Upon rupturing the weak tear seam 60, the inflatable vehicle occupant protection device 20 initially deploys primarily laterally relative to the vehicle occupant 15. Because only a portion of the inflatable occupant protection device 20 can inflate and deploy laterally, the pressure in the device increases, and the force applied by the device to the cover 40 also increases. A second portion 24 of the inflatable vehicle occupant protection device 20 subsequently ruptures the strong tear seam 50. Upon rupturing the strong tear seam 50, the inflatable vehicle occupant protection device deploys primarily in a direction toward the vehicle occupant 15 (FIG. 3).

Figure 2:
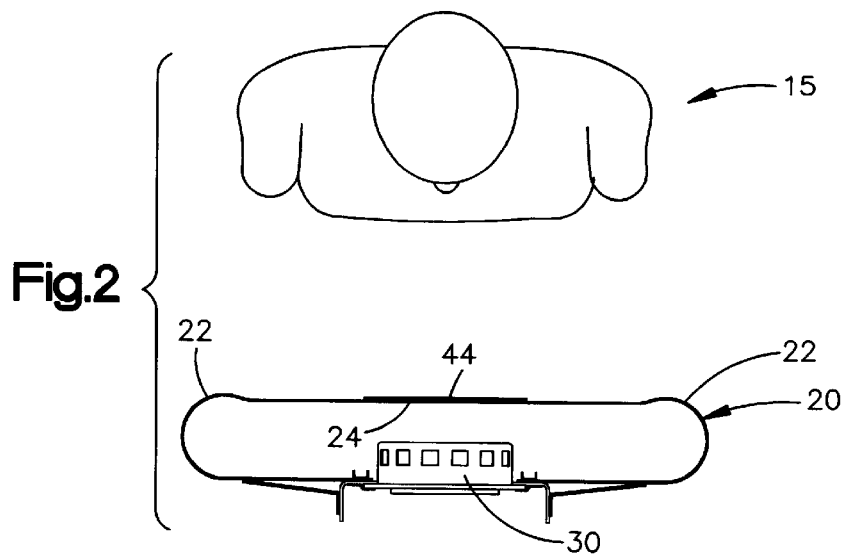
FIG. 2 is a schematic view of the apparatus of FIG. 1 illustrating an operating condition of the apparatus.
Figure 3:
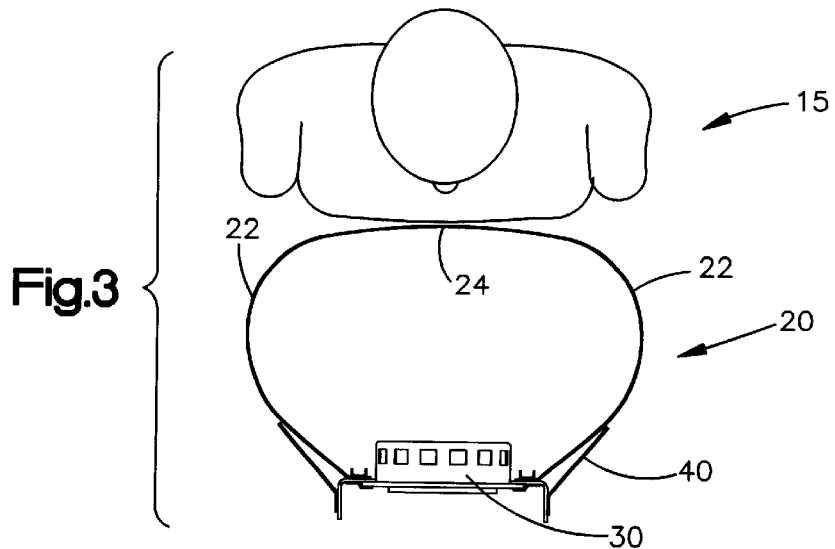
FIG. 3 is a schematic view of the apparatus of FIG. 2 illustrating a different operating condition of the apparatus.

The rupturing of the weak and strong tear seams, illustrated in FIGS. 2 and 3, respectively, typically occur within milliseconds of each other. The initial lateral deployment of the portion 22 of the inflatable vehicle occupant protection device 20 lessens the initial impact of the device on the vehicle occupant 15, as compared to a similar device with a cover in which a front wall initially opens fully.

As seen in FIG. 4, the cover 40, representative of one embodiment of the present invention, has the strong tear seam 50 located entirely in the side wall 42a. The tear seam 50 extends along a straight line. A first, U-shaped weak tear seam 60 is located entirely in the side wall 42b. A second, U-shaped weak tear seam 60 is located opposite the first weak tear seam 60 entirely in the side wall 42d opposite the side wall 42b. No portion of any tear seam is located in the front wall 44 of the cover 40.

During a vehicle collision, as the inflatable vehicle occupant protection device 20 begins to inflate, the weak tear seams 60 are ruptured by the force applied by the first portion 22 of the inflatable vehicle occupant protection device 20. The first portion 22 of the inflatable vehicle occupant protection device moves portions of the walls 42b, 42d defined by the tear seams 60 away from the front wall 44. Because the front wall 44 remains in place, the inflatable vehicle occupant protection device initially deploys primarily laterally from the opposite sides 42b, 42d of the cover 40 as shown in FIG. 2. As only a portion of the inflatable occupant protection device 20 can inflate and deploy laterally, the fluid pressure in the device increases, and the force applied by the device to the cover 40 also increases. After the weak tear seams 60 rupture, the force applied by a second portion 24 of the inflatable vehicle occupant protection device 20 on the front wall 44 ruptures the strong tear seam 50. The second portion 24 of the inflatable occupant protection device 20 causes the front wall 44 to pivot relative to side wall 42c, and the inflatable vehicle occupant protection device 20 deploys primarily toward the vehicle occupant 15.

Figure 5:
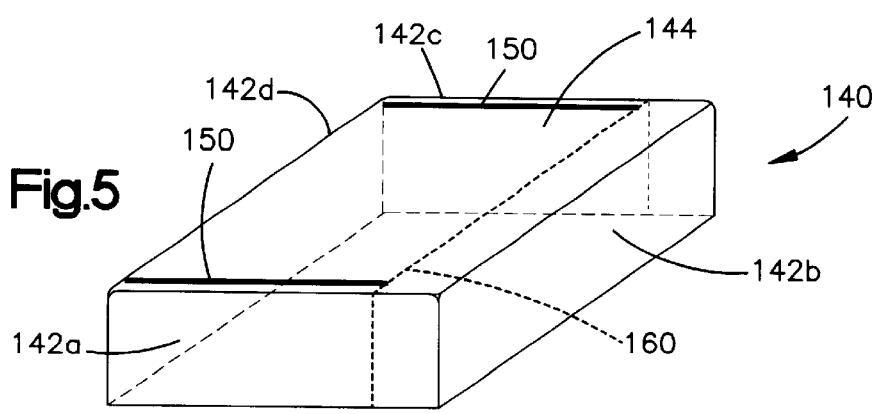
FIG. 5 is a schematic view of part of an apparatus embodying a second embodiment of the present invention.

As seen in FIG. 5, a cover 140, representative of a second embodiment of the present invention, has four side walls 142a, 142b, 142c, 142d and a front wall 144. The cover 140 also has two linear strong tear seams 150 spaced apart from each other. The strong tear seams 150 are located in the front wall 144 of the cover 140. The tear seams 150 extend parallel to each other and are of the same length. One continuous weak tear seam 160 extends across the side wall 142a, across the front wall 144, and across side wall 142c. One end of each strong tear seam 150 terminates at the weak tear seam 160. The other end of each strong tear seam 150 terminates near side wall 142d.

During a vehicle collision, as the inflatable vehicle occupant protection device 20 begins to inflate, the weak tear seam 160 ruptures. The inflatable vehicle occupant protection device 20 initially deploys primarily laterally from one side of the cover 40. After the weak tear seam 160 ruptures, the strong tear seams 150 rupture, and the inflatable vehicle occupant protection device 20 deploys primarily toward the vehicle occupant 15.

Figure 6:
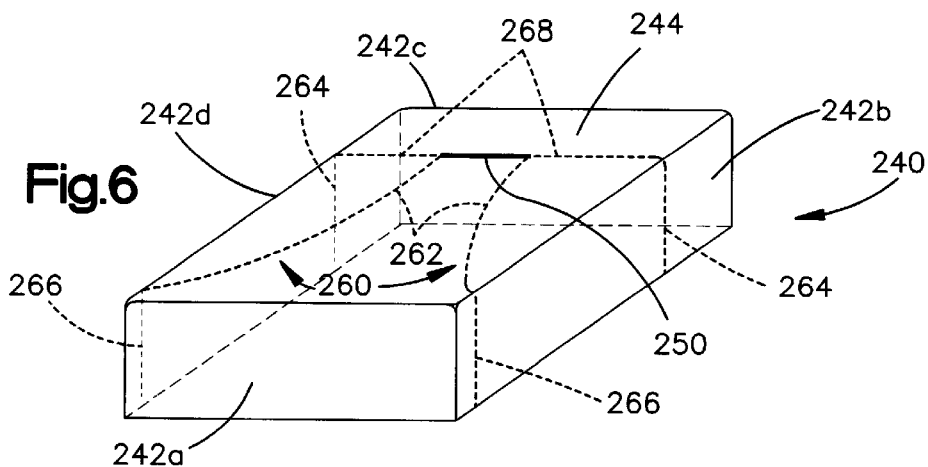
FIG. 6 is a schematic view of part of an apparatus embodying a third embodiment of the present invention.

As seen in FIG. 6, a cover 240, representative of a third embodiment of the present invention, has four side walls 242a, 242b, 242c, 242d and a front wall 244. The cover 240 also has two, U-shaped weak tear seams 260, each with a curved portion 262 and three straight portions 264, 266, 268. One of the weak tear seams 260 has its first straight portion 264 and its second straight portion 266 located in side wall 242b, and its third straight portion 268 and the curved portion 262 in the front wall 244. The other of the weak tear seams 260 has its first straight portion 264 and its second straight portion 266 located in side wall 242d and its third straight portion 268 and its curved portion 262 in the front wall 244. A strong tear seam 250 is located in the front wall 244 and interconnects the two weak tear seams 260. The strong tear seam 250 is on a line containing the straight tear seam portions 268 of the weak tear seams 260.

During a vehicle collision, as the inflatable vehicle occupant protection device 20 begins to inflate, the weak tear seams 260 rupture. The inflatable vehicle occupant protection device 20 initially deploys primarily laterally from opposite sides of the cover 240. After the weak tear seams 260 rupture, the strong tear seam 250 ruptures, and the inflatable vehicle occupant protection device 20 deploys primarily toward the vehicle occupant 15.

Figure 7:
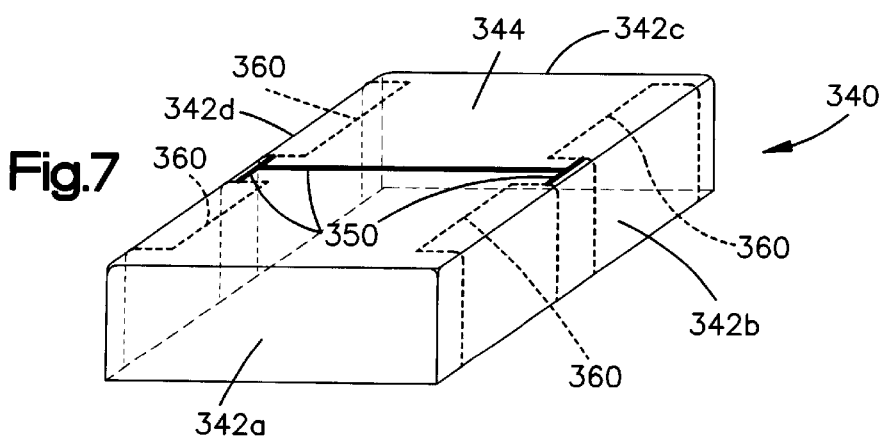
FIG. 7 is a schematic view of part of an apparatus embodying a fourth embodiment of the present invention.

As seen in FIG. 7, a cover 340 representative of a fourth embodiment of the present invention, has four side walls 342a, 342b, 342c, 342d and a front wall 344. The cover 340 also has four weak tear seams 360 spaced apart from each other. Each weak tear seam 360 is U-shaped and extends across a portion of the front wall 344 and a side wall 342b or 342d. In particular, the legs of each U-shaped weak tear seam 360 extend up a side wall 342b or 342d to the front wall 344. The base and a short length of the legs of each U-shaped weak tear seam are located in the front wall 344. An H-shaped strong tear seam 350 extends across the entire width of the front wall 344 and is located centrally of the front wall 344. Two weak tear seams 360 are located on each side of the H-shaped strong tear seam 350. The legs of the H-shaped strong tear seam extend adjacent opposite side walls 342b and 342d and between adjacent weak tear seams 360. The center portion of the strong tear seam 350 extends across the front wall 344 between the legs of the strong tear seam.

During a vehicle collision, as the inflatable vehicle occupant protection device 20 begins to inflate, the weak tear seams 360 rupture. The inflatable vehicle occupant protection device 20 initially deploys primarily laterally from opposite sides of the cover 340. After the weak tear seams 360 rupture, the strong tear seam 350 ruptures, and the inflatable vehicle occupant protection device 20 deploys primarily toward the vehicle occupant 15.

With regard to all of the embodiments, the thickness of the cover material defining the weak tear seams is typically about one-fourth (¼) the thickness of the cover material defining the strong tear seams. Also, with regard to all of the embodiments, the cover is illustrated as rectangular in shape. However, the cover may be any shape.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a vehicle occupant comprising:

an inflatable vehicle occupant protection device;

an inflator for providing inflation fluid to inflate said vehicle occupant protection device; and a cover for said vehicle occupant protection device, said cover having side walls and a front wall for positioning between the vehicle occupant and said inflatable vehicle occupant protection device, said cover having at least one strong tear seam and at least one weak tear seam, said at least one weak tear seam tearing when subjected to a first force by said inflatable vehicle occupant protection device, said at least one strong tear seam tearing when subjected to a second force by said inflatable vehicle occupant protection device, said second force being larger than said first force, said strong and weak tear seams being located so that a first portion of said inflatable vehicle occupant protection device initially ruptures said weak tear seam and said inflatable vehicle occupant protection device initially deploys in a direction parallel to said front wall of said cover over a greater distance than deployment transverse to said front wall of said cover and toward the vehicle occupant, and a second portion of said inflatable vehicle occupant protection device subse quently ruptures said at least one strong tear seam and said inflatable vehicle occupant protection device deploys primarily in a direction toward the vehicle occupant.

2. The apparatus as defined in claim 1 wherein said at least one strong tear seam is located in one of said side walls.

3. The apparatus as defined in claim 2 wherein a first weak tear seam is located entirely in a first side wall and a second weak tear seam is located entirely in a second side wall.

4. The apparatus as defined in claim 2 wherein no portion of any tear seam is located in said front wall.

5. The apparatus as defined in claim 1 wherein said at least one strong tear seam includes two strong tear seams spaced apart from each other.

6. The apparatus as defined in claim 5 wherein said weak tear seam comprises one continuous tear seam extending across one of said side walls, across said front wall, and across another of said side walls opposite said one of said side walls.

7. The apparatus as defined in claim 5 wherein said two strong tear seams are located in said front wall and extend parallel to each other.

8. The apparatus as defined in claim 1 wherein said at least one weak tear seam includes at least one curved portion and at least one straight portion.

9. The apparatus as defined in claim 8 wherein said curved portion and straight portion are located in said front wall.

10. The apparatus as defined in claim 9 wherein said at least one strong tear seam is located entirely in said front wall.

11. The apparatus as defined in claim 1 wherein said at least one weak tear seam includes four, U-shaped weak tear seams spaced apart from each other.

12. The apparatus as defined in claim 11 wherein each of said four weak tear seams extend across a portion of said front wall and a portion of at least one of said side walls.

13. The apparatus as defined in claim 11 wherein said at least one strong tear seam extends across said front wall.

14. The apparatus as defined in claim 13 wherein said strong tear seam is H-shaped.

* * * * *